United States Patent [19]

Kurihara et al.

[11] Patent Number: 4,728,861

[45] Date of Patent: Mar. 1, 1988

[54] LIGHT CONTROL APPARATUS FOR A VEHICLE

[75] Inventors: Norimitsu Kurihara, Wako; Yoshikazu Tsuchiya; Akira Kikuchi, both of Fujimi; Kunio Okazaki, Hatano; Toru Tanabe, Yokohama, all of Japan

[73] Assignees: Honda Motor Co., Ltd.; Stanley Electric Co., Ltd., both of Tokyo, Japan

[21] Appl. No.: 802,764

[22] Filed: Nov. 27, 1985

[30] Foreign Application Priority Data

Dec. 25, 1984 [JP] Japan .................. 59-275132

[51] Int. Cl.⁴ .................. B60Q 1/02; G08B 21/00
[52] U.S. Cl. .................. 315/83; 315/82; 315/133; 315/134; 315/159; 340/52 R; 340/507; 340/508; 340/509; 340/600; 340/635; 307/10 LS
[58] Field of Search .................. 315/82, 83, 76, 77, 315/133, 134; 340/66, 74, 76, 79, 80, 600, 635, 641, 507–509, 52 R, 52 F; 307/10 LS

[56] References Cited

U.S. PATENT DOCUMENTS

| | | | |
|---|---|---|---|
| 4,139,801 | 2/1979 | Linares | 315/83 |
| 4,306,218 | 12/1981 | Leconte et al. | 340/74 X |
| 4,376,909 | 3/1983 | Tagami et al. | 315/82 |
| 4,438,422 | 3/1984 | Nojiri et al. | 340/52 F |
| 4,613,791 | 9/1986 | Kurihara et al. | 315/82 |

Primary Examiner—David K. Moore
Assistant Examiner—Mark R. Powell
Attorney, Agent, or Firm—Frishauf, Holtz, Goodman & Woodward

[57] ABSTRACT

A light control apparatus for a vehicle is integrated with headlamp driving relays, a light sensor, a lighting switch which selects a manual mode or an automatic mode, and a control unit which controls the relays in accordance with the light sensor output when the lighting switch selects the automatic mode and turns on or off the headlamps. Two power source systems and two headlamp driving systems are provided. The signal level of a given terminal of the control unit is detected and is input to the microcomputer of the control unit. The microcomputer judges whether or not trouble has occurred by detecting a level difference. An alarm indication is given by a lamp or a buzzer if trouble is detected.

9 Claims, 4 Drawing Figures

LIGHT CONTROL APPARATUS FOR A VEHICLE

BACKGROUND OF THE INVENTION

1. Field of the Invention

The present invention relates to a light control apparatus for a vehicle which automatically turns on or off a vehicle headlamp.

2. Description of the Prior Art

A conventional control apparatus is shown in FIG. 4. In FIG. 4, 1 is a battery, 2 is a main fuse, 3 is an ignition switch, 4 is a control unit, 5 is a light sensor, 6A and 6B are headlamps, 7A and 7B are small lamps, 8 is a headlamp driving relay, 9 is a small lamp driving relay, 10 is a lighting switch and 11 to 14 are fuses. The battery 1 supplies power to the control unit 4 through the ignition switch 3.

In the OFF mode of the lighting switch 10, (open circuit conditions of the terminals AUTO, SMALL, and HEAD) the terminals AUTO, SMALL and HEAD of the unit 4 are all opened. In selecting the terminal (mode) SMALL, the terminal SMALL of the unit 4 is closed (remaining terminals are opened). In selecting the mode HEAD, the terminals SMALL and HEAD of the unit 4 are closed (terminal AUTO is opened). In selecting the mode AUTO, only the terminal AUTO of the unit 4 is closed (remaining terminals are opened), and the headlamps 6A, 6B and the small lamps 7A, 7B are driven by the control unit 4 through a relay respectively. The light sensor 5 is connected to the unit 4 with three lines; namely a power source line, a sensor output line and a grounding (SG) line.

When the mode HEAD on the lighting switch 10 is selected, the terminals SMALL and HEAD of the control unit 4 are closed (grounded), both relays 8 and 9 are driven and the headlamps 6A, 6B and the small lamps 7A, 7B are turned on. When the mode SMALL is selected, the terminal SMALL of the unit 4 is closed, and the relay 9 is driven to turn on the small lamps 7A and 7B. And when the mode AUTO is selected, the terminal AUTO of the unit 4 is closed, and the headlamps 6A and 6B are turned on or off in accordance with the output of the light sensor 5 through the control of the unit 4.

In this way, by selecting the automatic mode of the lighting switch 10, turning on or off the headlamp is automatically controlled. However, the above configuration has the following disadvantages.

(1) Since the power source supply is from only one fused source, if one of the units of the system malfunctions, even if the main unit is properly operating, excessive current is generated, and when the fuse is melted, all the headlamps are turned off. This brings about a very dangerous condition for night driving.

(2) Since the power source supply is from only one cable and, further, a connector is used in connecting the units, a loose contact or a cable break affects the system control, and this reduces reliability.

(3) The headlamps are turned on or off through the output of light sensor 5; however, a connector is used in connecting the light sensor 5 with the control unit 4 and this causes the problem of reducing reliability due to the connector contacts.

(4) Unless the terminal AUTO is in a completely closed condition, from the structural state of the lighting switch 10, there is a possibility that a manual mode is generated and the headlamps are turned off. Most of the recent lighting switches are of the direct coupling type. Since each signal is distributed through the connector, if the terminal AUTO is connected only via the contact of the connector, the problem in reliability described in item (2) remains.

(5) Since the headlamps are driven by only one relay, improving the headlamp reliability is restricted by the reliability of one relay.

(6) In the case of the problem of microcomputer runaway, there is a possibility that the headlamps being lighted are suddenly turned off, and safety in driving can not be assured.

OBJECT OF THE INVENTION

An object of the present invention is to provide a highly reliable light control apparatus for a vehicle.

SUMMARY OF THE INVENTION

The present invention adopts two systems for the power source supply and for driving the headlamps in light control apparatus for a vehicle, wherein the device is integrated with the headlamp driving system using relays, a light sensor, a lighting switch which selects between the manual mode and the automatic mode, and a controlling unit which controls the headlamp driving relay in accordance with the output of said light sensor when the lighting switch selects the automatic mode, and turns on or off the headlamps. In addition, it employs a structure and a connection to improve the stability and the reliability of the system wherein by detecting a necessary terminal signal level of the control unit and by inputting the detected level into a microcomputer enclosed in the unit, a judgement of whether trouble exists or not by a level difference is done. A trouble warning lamp and a buzzer are provided for indicating trouble, and all the control unit terminals are opened when the lighting switch selects the automatic mode. Further, if the computer itself fails and loses the controlling function, the appartus includes a failsafe function.

DETAILED DESCRIPTION OF THE INVENTION

Figure 1:
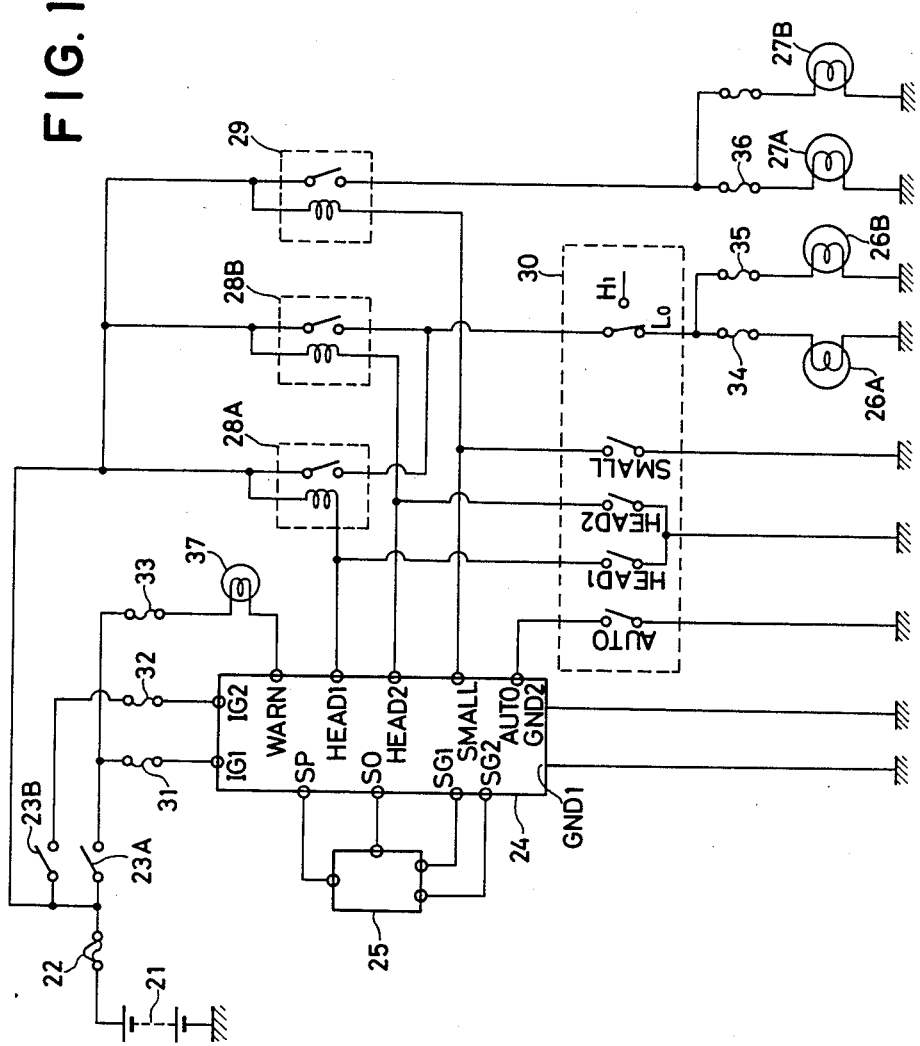
FIG. 1 is a wiring diagram showing an embodiment of a light controlling apparatus for a vehicle according to the present invention.
Figure 2:
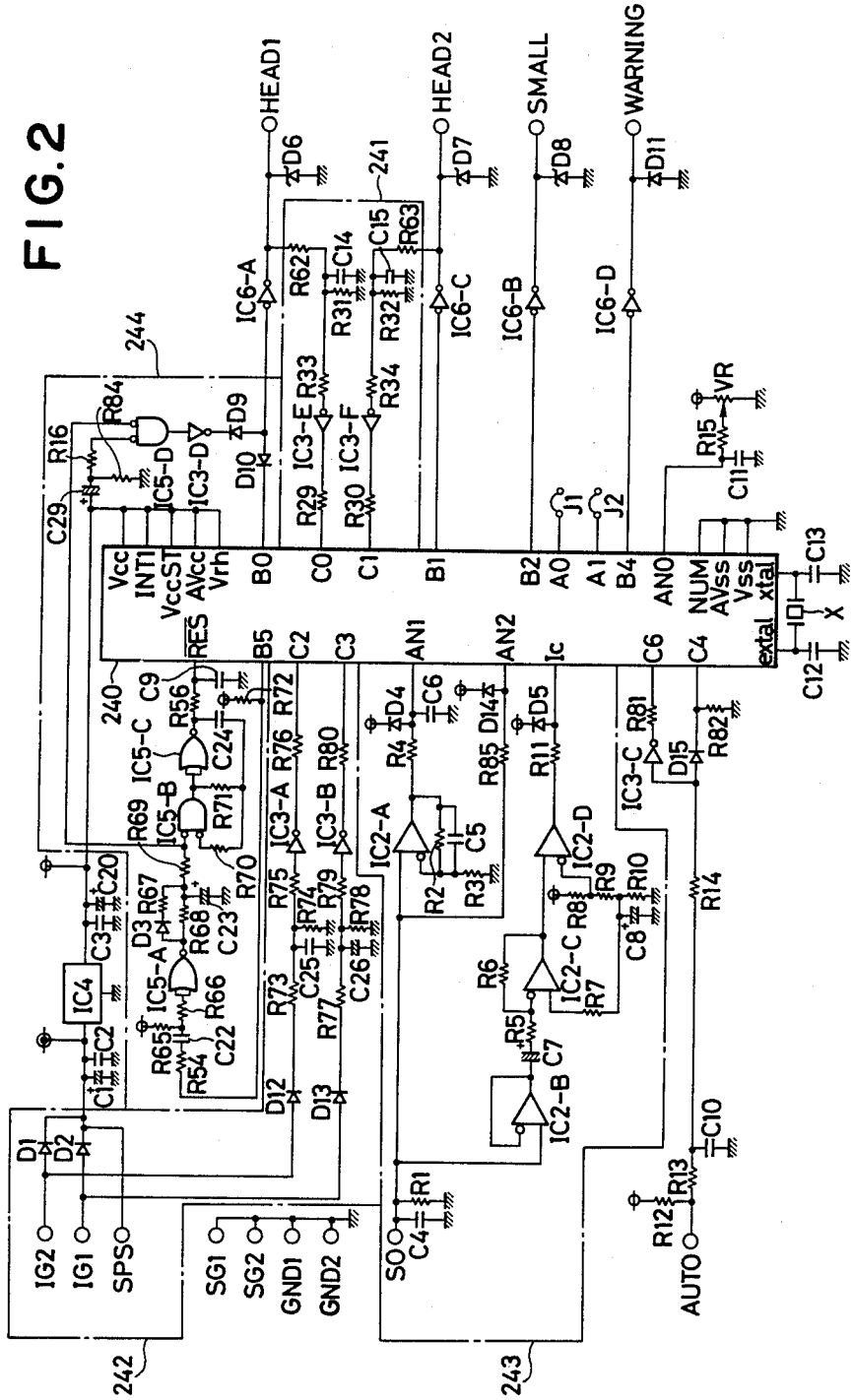
FIG. 2 is a circuit diagram of the control unit of said embodiment of the invention.

FIGS. 1 and 2 show one example of an embodiment of the present invention, wherein 21 is a battery, 22 is a main fuse, 23A and 23B are ignition switches, 24 is a control unit, 25 is a light sensor, 26A and 26B are headlamps, 27A and 27B are small lamps, 28A and 28B are headlamp driving relays, 29 is a small lamp driving relay, 30 is a lighting switch unit, 31 to 36 are fuses and 37 is a warning lamp. The supply to the two terminals IG1 and IG2 of the control unit 24 is done through the ignition switches 23A and 23B in the form of two systems. In this case, the lines for grounding are double, providing two terminals GND1 and GND2 on the grounding side of control unit 24. Regarding the connection of the light sensor 25 to the unit 24, the grounding lines are double. The control unit 24 thus is provided with two grounding terminals SG1 and SG2, the terminal SO for the sensor output signal and the terminal SP for the sensor power source.

Regarding the lighting switch unit 30, only the terminal AUTO of the control unit 24 is closed by the switch unit in the OFF period or mode (remaining terminals SMALL, HEAD1 and HEAD2 are opened). When the mode SMALL is selected, the terminals AUTO and SMALL of the control unit 24 are closed (remaining terminals HEAD1 and HEAD2 are opened), when the mode AUTO is selected, all the terminals AUTO, SMALL, HEAD1 and HEAD2 are opened, and when the modes HEAD1 and HEAD2 are selected, the terminals AUTO, HEAD1 and HEAD2 of the control unit 24 are closed by switch unit 30 (remaining terminal SMALL is open). The headlamps 26A and 26B are driven in the form of two parallel systems through the two relays 28A and 28B.

The above described warning lamp 37 indicates for each system as to whether an abnormal condition exists for the power sources, or for the headlamp driving relays of the two systems. Even if one system has trouble, the trouble is indicated with a lamp alarm.

FIG. 2 shows the circuit configuration of the control unit 24. The control unit 24 comprises a microcomputer 24D integrated with a headlamp trouble detection circuit 241, a power source trouble detection circuit 242, an output processing circuit 243 for the light sensor 25 (integrated with operational amplifiers IC2-A–IC2-D, resistances R1–R11, capacitors C4–C8, etc.), a failsafe circuit 244 (integrated with capacitors C22–C24, diodes D9, D10, etc.) which exerts a failsafe function for the microcomputer's runaway, and a circuit to which the microcomputer 240 and the terminals WARN, AUTO, SMALL are connected.

The headlamp trouble detection circuit 241 is for detecting trouble in the headlamp driving system. In explanation of the terminal HEAD1 circuit in which the same integration is provided for each system, the resistance R29 between the terminal C0 of the microcomputer 240 and the terminal HEAD1, the inverter IC3-E and the series circuit of the resistance R33 and the resistance R62 are connected. A parallel circuit of a resistance R31 and capacitor C14 is connected between the junction of resistance R33 and resistance R62, and ground.

The power source abnormal condition detecting circuit 242 is for detecting power source trouble due to fuse melting, loose contact of connector, etc. Both systems of the terminals IG1 and IG2 have the same integration. Between the terminal IG2 and the terminal C2 of the microcomputer 240, is connected a series circuit of a diode D12, resistances R73 and R75, inverter IC3-A and resistance R76. A parallel circuit of resistance R74 and capacitor C25 is connected between the junction of the resistance R73 to the resistance R75, and ground.

When an abnormal condition is detected by both detecting circuits 241 and 242, the terminal WARN becomes "L" level (in accordance with the terminal B4 becoming "L" level through the operation of microcomputer 240). In this manner, the warning lamp 37 (FIG. 1) is turned on and the alarm for an abnormal condition is indicated.

The failsafe circuit 244, which operates when the microcomputer 240 fails by runaway, is explained next.

IC6-A is a transistor connected in an open collector configuration, IC3-D is an inverter, IC4 is a switching regulator and IC5-A to IC5-D are "nor" gates.

The microcomputer 240, when adapted in the present light control apparatus for a vehicle, is the main part of the control unit, and controls turning on or off of the headlamps in accordance with the light sensor output. It has a port B0, a port B5 which generates pulses at a constant period under normal operation, a reset terminal $\overline{\text{RES}}$ and a power source terminal Vcc, etc. D3, D9 and D10 are diodes, R16, R23, R54, R56, R65, to D69, R72 and R84 are resistances, C1 to C3, C9, C20, C22 to C24 and C29 are capacitors, D6 is a Zener diode and x is crystal oscillator. The Zener diode D6 is connected between the terminal HEAD1 and ground. The terminal HEAD1 is connected to the output port B0 of the microcomputer 240 through the transistor IC6-A and the diode D10. The above-described switching regulator IC4 is connected to the terminals IG1 and IG2 at the input side, and is connected to the power source terminal Vcc of the microcomputer 240 at the output side. The capacitors C1 and C2 are provided at the input side of the regulator IC4, and the capacitors C3 and C20 are provided at the output side.

The "nor" gates IC5-B and IC5-C, the resistances R70 and R71, and the capacitor C24 integrate to form an astable multivibrator, and the output thereof is coupled to the reset terminal $\overline{\text{RES}}$ of the microcomputer 240 through the resistance R56. This multivibrator oscillates or stops oscillating in accordance with the signal level at the other input terminal (inhibit terminal) of "nor" gate IC5-B. The control signal is generated by applying the signal, generated by the resistances R54, R65 to R66, the capacitor C22 and the nor gate IC5-A, which synchronizes with the period of pulses appearing at the port B5 of the microcomputer 240, to the time constant circuit integrated with the resistances R67 to R69, the capacitor C23 and the diode D3. When the charged voltage of the capacitor C23 is higher than the input threshold value of the nor gate IC5-B, oscillating is stopped, and when it is lower than the input threshold value, oscillating is enabled. In the oscillating period, resetting is repeated by the output. The nor gate IC5-D receives a signal at one of its input terminals, which is applied to the input terminal of the nor gate IC5-B of said multivibrator, and receives the output of a time constant circuit, which is connected to the power source terminal Vcc and comprises capacitor C29 and resistance R84, through the resistance R16 at the other input terminal. The level of the output is inverted through the inverter IC3-D, and controls the transistor IC6-A through the diode D9. In other words, the level of the terminal HEAD1 is forced to become "L" level (the level at which a headlamp is turned on) when the computer 240 fails in runaway. Further, all of the diodes D9 and D10, the output port B0 of the microcomputer 240 and the inverter IC3-D combine to form an OR circuit to make control of transistor IC6-A possible. Operation is explained next.

When the mode HEAD1 and HEAD2 of switch unit 30 is selected, the terminals AUTO, HEAD1 and HEAD2 of the control unit 24 are turned ON, and the headlamps 26A and 26B are turned on through driving of the relays 28A and 28B. Further, when the mode AUTO is selected, all the terminals SMALL, HEAD1, HEAD2 and AUTO of the unit 24 are OFF, the relays 28A and 28B are automatically controlled in accordance with the output of the light sensor 25, and the headlamps 26A and 26B are turned on or off.

In this case, except in the automatic mode, the terminal AUTO of the unit 24 becomes ON (grounded) surely because of the two ground systems, preventing a malfunction of high illumination intensity resulting from grounding line trouble (such as a line break) and poor reliability in turning off the headlamps. Also, all terminals are opened for the automatic mode, meaning that the automatic mode operates in the most stable condition. The two systems of the grounding lines are based on the fact that the light is proportional to the output voltage of the sensor; if the light is counterproportional to the sensor output voltage, two systems can be adapted for the power source (+) line.

The abnormal condition detection operation is explained next.

A. Trouble Detection of Power Source System

The power source is supplied to the terminals IG1 and IG2 of the unit 24 and is applied to the switching power source IC4 in the form of an OR circuit through the diodes D1 and D2. The output of IC4 is supplied to the microcomputer 240 and etc. The same power source voltage is applied to terminals IG1 and IG2 is applied to the circuits comprising the diodes D12 and D13, and is applied to the terminals C2 and C3 of microcomputer 240 after being inverted by the inverters IC3-A and IC3-B. When normal battery voltage is applied to the terminals IG1 and IG2, both of the terminals C2 and C3 of the microcomputer 240 become "L" level.

If a trouble occurs and the fuse 31 or 32 of the terminal IG1 or the terminal IG2 melts, or if the connector has a loose contact, different input levels are generated at the terminals C2 and C3. For example, if the fuse is melted (or the connector is loosened) for the terminal IG1 while the terminal IG2 is normal, the terminal C2 becomes "L" and the terminal C3 becomes "H". On the contrary, in the case where the fuse is melted for the terminal IG2 (or the connector is loosened), while the terminal IG1 is normal, the terminal C2 becomes "H" and the terminal C3 becomes "L".

When a level difference is generated between terminals C2 and C3, the port B4 of the microcomputer 240 becomes "L" judging that there is power source trouble. As a result, the warning lamp 37 is turned on, and a trouble detection is indicated to the driver.

Since the terminal IG2 is "L" while the starter motor is being rotated, the warning lamp is actually turned on a short time after the level difference is generated between the terminals C2 and C3. This delay may be obtained with a hardware integration.

B. Trouble Detection for Headlamp Driving System

Under the lighting condition of the headlamps in accordance with the ambient condition, both of the ports B0 and B1 of the microcomputer 240 become "L", and the outputs of the transistors IC6-A and IC6-C of the open-collector type become "L". The relays 28A and 28B connected to the terminals HEAD1 and HEAD2 are driven to turn on the headlamps 26A and 26B. At this time, the outputs of the inverters IC3-E and IC3-F, in other words the inputs to the terminals C0 and C1 of the microcomputer 240, are both "H".

On the contrary, under a turning off condition of the headlamps, the terminals HEAD1 and HEAD2 become "H" through the coils of the relays 28A and 28B, and both of the terminals C0 and C1 of the microcomputer 240 become "L".

I. Headlamp OFF Condition (i) In the case where the port B0 or B1 of the microcomputer 240 becomes "L" level due to trouble, for example, when the port B0 becomes "L", the output of the transistor IC6-A of the open collector type becomes "L", and the headlamp is turned on. In this condition, the output of the inverter IC3-E, in other words, the level of the terminal C0 of the microcomputer 240, becomes "H". At this time, the level of the terminal C1 is "L".

The port B4 of the microcomputer 240 is driven to become "L", judging that the trouble occurs by detection of the level difference between the terminals C0 and C1, and then the warning lamp 37 is turned on. Instead of the warning lamp 37, a buzzer may be used, or a buzzer may be used together with warning lamp 37.

Usually, the driver does not realize that the headlamps are turned on, so this alarm system is useful.

(ii) In the case where the input or the output of one of the transistors IC6-A and IC6-C of the open collector configuration become "L" due to trouble, the alarm is transmitted in the same way as in I(i) above.

(iii) In the case where one of the relays 28A and 28B, connected to the terminals HEAD1 and HEAD2, has trouble such as a coil break, a disconnected or loose contact of the connector, the input of the inverter IC3-E (IC3-F) is fixed to be "L" by the resistance R31 (R32), and the terminal C0(C1) becomes "H". As a result, the microcomputer 240 judges that a trouble has occurred, the port B4 becomes "L" and the warning lamp 37 is turned on.

Since the above described trouble detection is done in the daytime when the headlamps are not necessary and the alarm is indicated, the driver can anticipate the trouble and can safely drive later in the nighttime if the trouble is immediately repaired.

II. Headlamp ON Condition (i) In the case where the port B0 or the port B1 of the microcomputer 240 does not become "L" due to trouble in the system, (i.e., a case where the headlamps are ON by only one of the terminals HEAD1 and HEAD2), for example, in the case where the port B0 does not become "L" and only the port B1 becomes "L", the output of the inverter IC3-E becomes "L" while the output of the inverter IC3-F is "H", and trouble is detected. The trouble is detectable if the cause of trouble is disconnection at the soldering joint of the print circuit board or a printed circuit pattern problem.

(ii) In the case where the input or output of the transistors IC6-A and IC6-C of the open collector configuration has a trouble, the trouble is detected in the same way as in item II(i) above.

Operation for the case when the microcomputer 240 fails is described next. When the microcomputer 240 normally operates, a pulse is generated at the port B5 at a constant period. As said pulse is differentiated by the capacitor C22, the output of the nor gate IC5-A becomes "H" synchronizing with the period of the pulses at the port B5. The output pulse said nor gate IC5-A is applied to the capacitor C23 through the parallel circuit of the resistances R67 and R68, and the capacitor C23 is charged. The width and frequency of the pulse are to be sufficient values to charge the capacitor C23.

In the case where the charging voltage of the capacitor C23 is higher than the input threshold value of the nor gate IC5-B which integrates the output of the astable multivibrator, the astable multivibrator does not oscillate. The output of the nor gate IC5-D becomes "L", and the output of the latter inverter IC3-D is "H".

Under the normal condition, when the port B0 is driven to become "L" level by the microcomputer 240, the terminal HEAD1 also becomes "L", and the headlamps are turned on.

If the microcomputer 240 falls into a runaway condition due to some reason, the port B5 becomes "H" or "L", and the input of the nor gate IC5-A becomes "H". Therefore, the output of nor gate IC5-A becomes "L". As a result, the capacitor C23 is discharged with a time constant RC where R is the resistance value of resistor R68 and C is the capacitance value of capacitor C23. When the voltage of capacitor C23 decreases below the input threshold value of the nor gates IC5-B and IC5-D, the astable multivibrator begins oscillating, and the oscillating pulse is applied to the microcomputer 240 as a reset pulse. When the reset pulse is applied to the microcomputer 240, it normally starts, and the pulse appears again at the port B5. Therefore, the astable multivibrator stops oscillating.

On the other hand, the output of the nor gate IC5-D simultaneously becomes "H" when the multivibrator begins oscillating, and the output of the inverter IC3-D becomes "L". As a result, the transistor IC6-A is driven and the terminal HEAD1 becomes "L" level. Namely, the terminal HEAD1 is forced to become "L" level when the microcomputer 240 falls into a runaway condition, and load driving (lighting of headlamps) is maintained. This load driving continues while the reset is repeated; in other words, while the trouble is occurring, this being a so-called failsafe condition.

When the power source is turned on, the capacitor C23 is in the discharging condition in which the failsafe function is driven since the output of the nor gate IC5-D is forced to become "L" level during a time constant RC (C29×R84) just after the power source is turned ON, and there is no misoperation.

Figure 3:
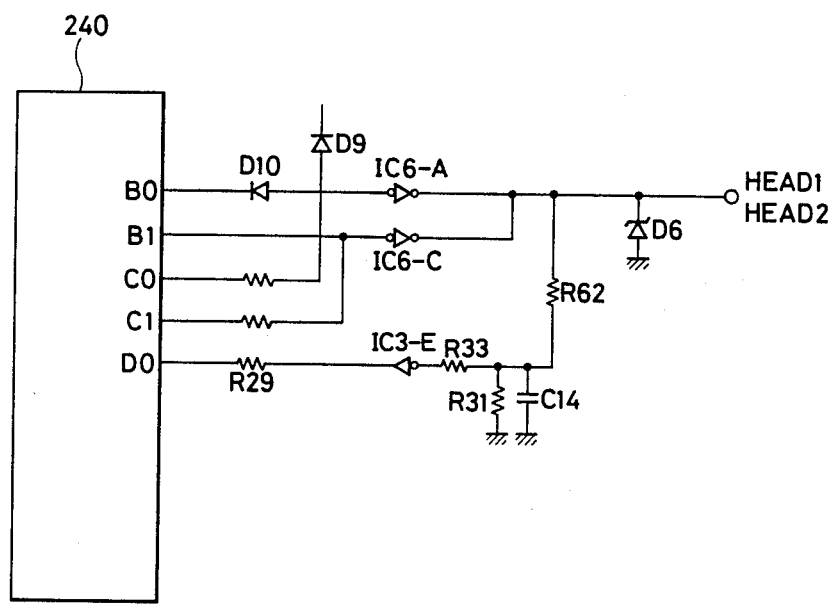
FIG. 3 is a circuit diagram showing the case in which one headlamp driving relay is used.
Figure 4:
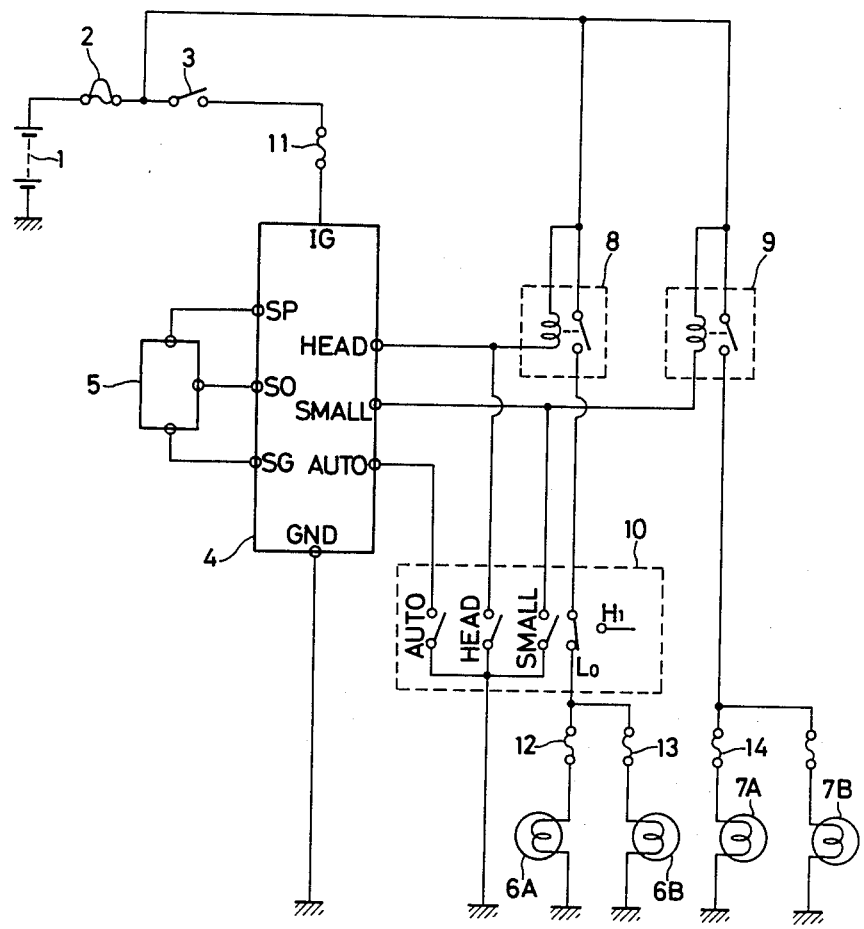
FIG. 4 is a circuit diagram showing a conventional system.

FIG. 3 shows an example of a circuit which is used in the case where only one headlamp relay for the vehicle is provided, in which both output terminals of transistors IC6-A and IC6-B of the open collector configuration are connected to each other and are connected to the single terminal HEAD1 (HEAD2).

In the case where an output does not appear at the port B0 or B1, the warning lamp 37 is turned on when the transistor IC6-A or IC6-C of the open collector configuration fails or a disconnection occurs at the soldered portion. Thus, the trouble is transmitted to the driver via warning lamp 37.

Also, if there is a loose contact of the headlamp relay, a disconnection or a coil break, these defects can be detected. The warning lamp 37 is turned on when one of these defects is detected.

The present invention has the following various effects.

(1) By providing two systems for the power source, due to trouble of system or accessory and fuse melting due to misconnection, the automatic function is not impaired and the undesirable condition of headlamp turning OFF can be prevented.

(2) For the case of power source cut-off due to a loose contact of a connector, high reliability can be maintained by providing two power lines or systems.

(3) Regarding connection of the light sensor to the control unit, by providing two systems for the grounding lines and the power source (+) lines, an erroneous judgment that high illumination intensity is needed can be avoided and safety is maintained.

(4) By providing lighting switches which are all opened to select the automatic (AUTO) mode, the automatic mode is obtained in the most stable condition.

(5) By providing the headlamp driving relays in parallel, the reliability of the driving system is enhanced, and the reliability of the whole apparatus is improved.

(6) By providing the two power sources and driving systems with the trouble detection circuits, trouble in one system can be immediately detected and indicated, the period of driving with only one system can be shortened by repair as soon as possible, and high reliability can be maintained.

(7) By using the pulse appearing at the port when the microcomputer 240 normally operates, a capacitor is charged, by causing the astable multivibrator to oscillate, and the microcomputer is reset when the charging voltage becomes lower than a constant voltage due to a microcomputer runaway condition. On the other hand, since the level of the output terminal is forced to be a level in load driving, if the microcomputer falls into a runaway condition during the period of recovery by repeating the reset function, the load driving becomes possible and the failsafe function can be exerted. Therefore, with the present headlamp control apparatus, the problem of abrupt headlamp turning OFF during nighttime driving can be prevented and safety in driving can be obtained. Further, by providing the time constant circuit so as to stop the failsafe function at one time when the power source is opened, misoperation at the time of turning the power source ON is prevented and smooth driving can be expected.

We claim:

1. In light control apparatus integrated with a vehicle headlamp driving system using headlamp driving relays, a light sensor, a lighting switch which selects between a manual mode or an automatic mode of operation, and a control unit having power supply and power ground terminals, light sensor terminals connected to said light sensor and operation mode terminals connected to said lighting switch and said relays, which unit controls the driving system relays in accordance with an output of the light sensor when the lighting switch selects the automatic mode for driving the headlamps; the improvement comprising;

two power source systems associated with said control unit and including two power supply lines connected to corresponding power supply terminals and two ground lines connected to corresponding ground terminals of said control unit, and two headlamp driving systems associated with the headlamps and connected to corresponding headlamp operation mode terminals of said control unit, wherein each headlamp driving system is arranged to apply a drive voltage to a common pair of headlamps, said control unit including microcomputer means and means for detecting signal levels at at least one set of said power supply terminals and said headlamp operation mode terminals of the control unit, and for coupling the detected levels to the microcomputer means, wherein said microcomputer means includes means for judging the existence of a fault condition according to a difference between signal levels detected at said at least one set of terminals, and an alarm indication system including a lamp or buzzer coupled to a warning terminal of said control unit for indicating a trouble condition in response to operation of said signal level detecting means and the judging means of said microcomputer means.

2. The light control apparatus for a vehicle of claim 1, wherein said control unit is constructed and arranged so that all the contacts of the lighting switch connected to said operation mode terminals are opened for selecting the automatic operation mode.

3. In vehicle light control apparatus which drives a load of vehicle headlamps, said apparatus including a microcomputer having a headlamp terminal as a control portion, the microcomputer having a port at which a pulse appears at a constant period when the microcomputer normally operates, the improvement comprising; a capacitor coupled to said port to be charged, detection circuit means for judging a microcomputer trouble condition when the charging voltage on said capacitor becomes lower than a constant value, and for producing a trouble detection signal, an astable multivibrator with an inhibit terminal which receives said trouble detection signal of the detection circuit means at said inhibit terminal and generates an oscillating pulse to a reset terminal of the microcomputer as a reset pulse, and a failsafe circuit coupled between said headlamp terminal and headlamp driving means for changing the level at said headlamp terminal to a level sufficient to turn a corresponding headlamp on when the trouble detection signal is generated, notwithstanding the level at the headlamp terminal of the microcomputer.

4. The light control apparatus of claim 1, wherein each of the power source systems associated with said control unit includes a fused line.

5. The light control apparatus of claim 4, including a separate ignition switch in series with each fused line.

6. The light control apparatus of claim 1, wherein each of said headlamp driving systems associated with the headlamps includes a headlamp relay with a switched output terminal for applying a drive voltage to the headlamps.

7. The light control apparatus of claim 6, wherein the headlamps have drive voltage terminals connected to one another, and the output terminals of said headlamp relays are connected to one another and to the commonly connected drive voltage terminals of the headlamps.

8. The light control apparatus of claim 1, wherein said signal level detecting means includes circuit means connected to each of said power supply terminals for sensing a difference in voltage levels at said power supply terminals and generating corresponding signals to said microcomputer means.

9. The light control apparatus of claim 1, wherein said detecting means includes circuit means connected to each of said headlamp operation mode terminals for sensing a difference in voltage levels at said headlamp operation mode terminals and generating corresponding signals to said microcomputer means.

* * * * *